June 28, 1938. H. SMITH 2,122,162
REGULATOR FOR THE CLOSING OF TWO HINGED PARTS
Filed Feb. 26, 1937 3 Sheets-Sheet 1
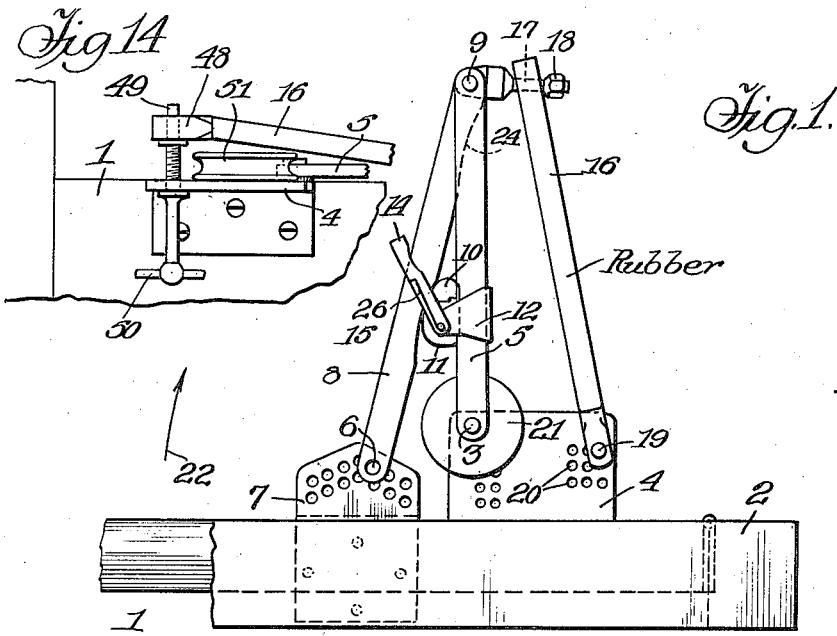
Fig. 14
Fig. 1
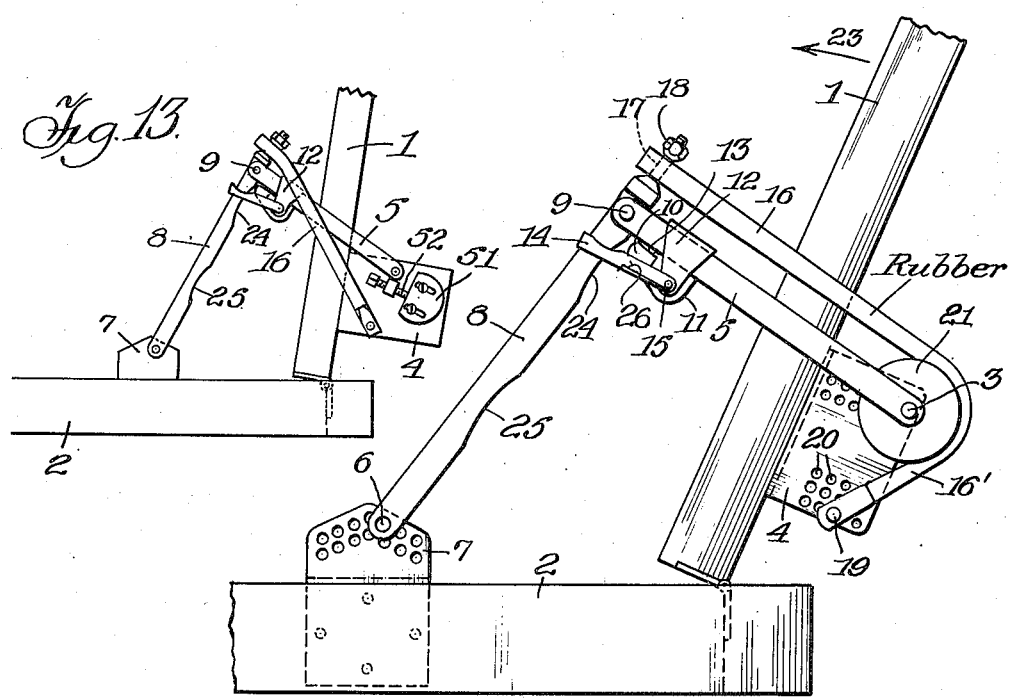
Fig. 13
Fig. 2
Inventor,
Harry Smith,
Dyrenforth, Lee, Chritton + Wiles, Attys.

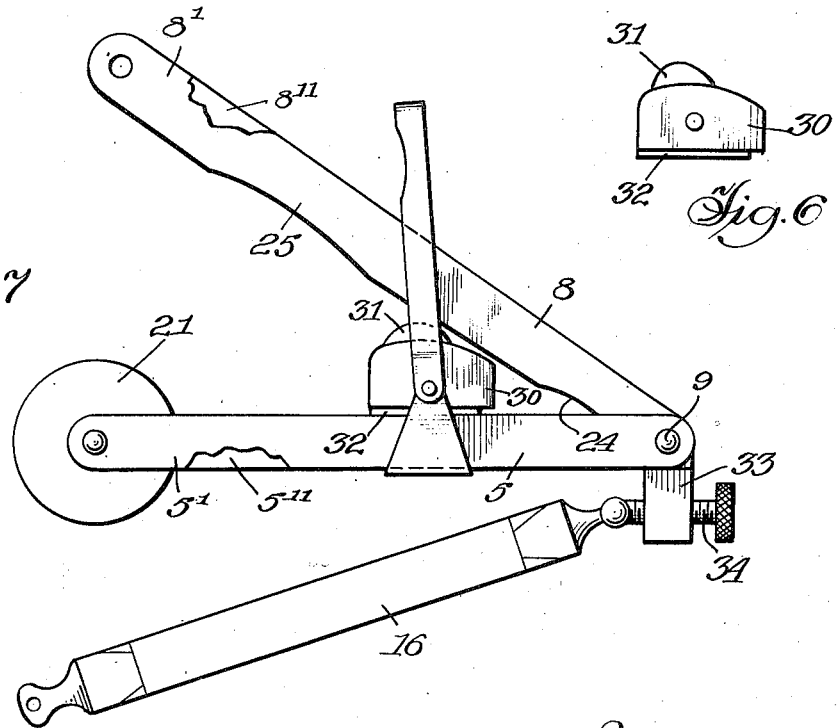

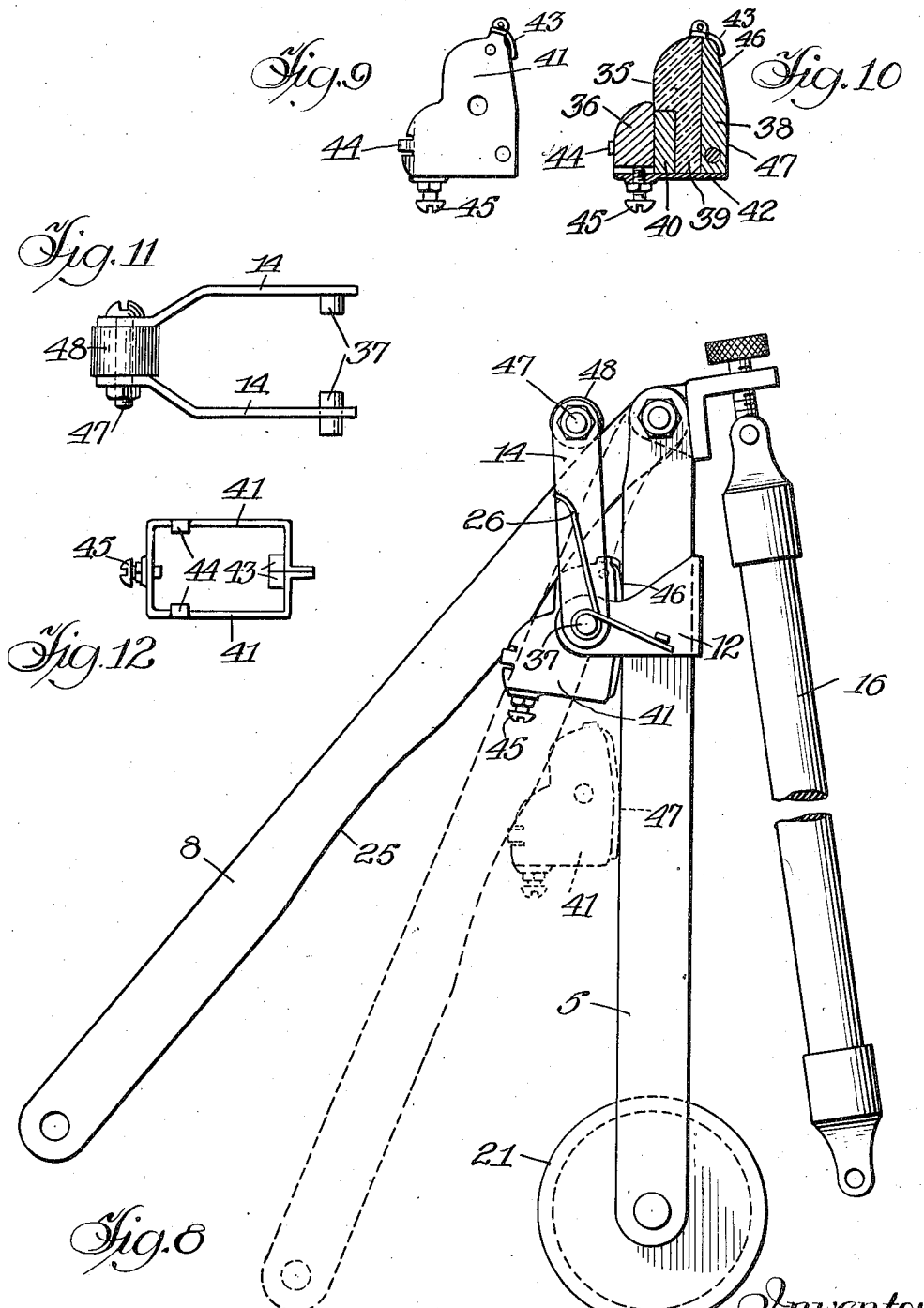

Patented June 28, 1938

2,122,162

UNITED STATES PATENT OFFICE 2,122,162

REGULATOR FOR THE CLOSING OF TWO HINGED PARTS

Harry Smith, Leytonstone, London, England, assignor to The Payson Manufacturing Co., Chicago, Ill., a corporation of Illinois Application February 26, 1937, Serial No. 128,007
In Great Britain February 28, 1936

16 Claims. (Cl. 16—49)

This invention relates to a regulator for the closing of two hinged parts. It is applicable particularly to the closing of doors, and for convenience of reference the two hinged parts will be referred to in the description as the door and the door frame. Such specific reference, however, is not intended to indicate that the invention is limited to use on doors. It may be applied generally to other hinged parts, such as lids of containers, etc.

In designing a regulator for the closing of a door, there is a two-fold problem to be solved. The regulator should effect the closing operation, on the one hand, with sufficient force to overcome the resistance of the spring bolt which must be depressed and, on the other hand, sufficiently gently to have the closing proceed smoothly and to prevent the door from striking the frame in case of a sudden violent closing. This problem has hitherto been solved reasonably satisfactorily only by hydraulic or pneumatic regulators, which are costly, get out of order easily and frequently require repair.

One object of the invention is to replace such hydraulic or pneumatic regulators by a purely mechanically acting regulator (the word "mechanically" being used in a contradistinction to "hydraulically" or "pneumatically"), which will satisfactorily perform the functions mentioned.

Another object is to provide equipment of this character which is cheap to manufacture, will work reliably for a long period without the necessity of adjustment and to which repairs may be easily effected if they are required.

These ends are attained by an arrangement which preferably includes two mechanical organizations, namely a device for automatically closing the hinged parts, and a brake adapted to come into operation during the closing. Although these devices are preferably used together, one can be used without the other. Broadly considered, the regulator comprises two arms, each pivoted at one end to one of the hinged parts and at the other end to the other arm in such a way that the angle between the arms varies during the closing of the parts, and a regulating member for mechanically varying the velocity of the closing movement in accordance with variations in the angle between the arms, this member being so associated with the arms that one part of it only is operative when the angle between the arms is large.

The invention is shown in the accompanying drawings, which illustrate several embodiments thereof.

Figure 1 is a diagrammatic plan view of one form of the device, with the parts closed;

Figure 2 is a diagrammatic plan view with the parts open;

Figure 3 is a detail showing the connection of one of the arms to one of the hinged parts;

Figure 4 is a detail showing the connection of the other arms to the other hinged part;

Figure 5 is a detail showing the connection of the two arms to each other;

Figure 6 is a detail of a modified form of brake;

Figure 7 is a diagrammatic plan view illustrating a modified form of device;

Figure 8 is a diagrammatic view similar to the showing of Figure 7 but illustrating the use of a modified form of brake structure;

Figure 9 is a side elevation of the form of brake element shown in Figure 8;

Figure 10 is a sectional elevation of the brake element shown in Figure 9;

Figure 11 is a plan view of a modified form of stirrup used in conjunction with the apparatus shown in Figure 8;

Figure 12 is an end elevation of the casing designed to carry the braking sections to form the complete brake element;

Figure 13 is a diagrammatic plan view of a further modified form of device; and

Figure 14 is an elevation thereof;

In the drawings, the hinged parts are illustrated as being a door 1 and a door frame 2, only part of the door frame being shown in Figure 1. Pivoted at 3 to a plate 4 fixed to the door 1 is an arm 5 and pivoted at 6 to a plate 7 fixed to the door frame 2 is an arm 8, the outer ends of the arms 5 and 8 being pivoted together at 9. It will be noted that the plates 4 and 7 are each preferably provided with a number of openings for the connection of the arms 5 and 8 respectively, so that the position of these arms with relation to each other and to the door and frame may be varied as desired. The arm 5 is preferably so adjusted as to be perpendicular or nearly so, in plan, to the door frame. As shown in Figures 3, 4 and 5, the arms 5 and 8 are composed of flat strip like bars 5', 5'' and 8', 8'' respectively, in which case they may be provided with inserted slideways for the braking element on the surfaces facing this element. They may, however, be made up in any other desired form. The surfaces of the arms facing the braking element are preferably of brass or pressed fibre or other material of similar frictional properties.

The braking element of the device, which is triangle shaped, is composed of two sections 10 and 11 of different frictional characteristics connected to each other in any suitable way and slidably mounted on the arm 5 by means of a stirrup 12, these sections being adapted frictionally to engage the arm 8 one after the other during the closing operation. The section 10, which first engages the arm 8 during closing and which is nearest to the connection 9 between the two arms, is of less height measured outwardly from the arm 5 than the section 11, the ratio of the heights of the sections being such that, during closing, first only the section 10 and finally only the section 11 engages the arm 8. Section 10 is made of material having a higher coefficient of friction, with the arm 8, than the material of section 11. For example, the material of section 10 may be made of soft rubber or it may be made of a harder material, mounted on a soft rubber seat or base. The material of section 11 may, for example, be pressed fiber, artificial rosin, or the like, which may or may not be mounted on a soft seat or base. Where the soft rubber base is employed it reduces the closing speed of the door in the ratio of the force applied to it. Preferably the section 11 is provided with a hard facing or base 13 of, for example, metal or pressed fibre, the friction between which and the arm 5 is small. Although the sections are shown as being rigidly connected to a substantially triangular block, this is not essential to the invention; they might both be, for example, semicircular and loosely connected as by a link. In order that, during opening of the door, the regulating member may be drawn towards the pivotal connection 9, it has a slidable device or stirrup 14 mounted on a short shaft 15 on which the braking element is pivotally mounted. It will be seen that as the links 5 and 8 are swung apart, the stirrups 12 and 14 being engaged by the outsides of said links, tend to limit such swinging movement and are thereby caused to slide toward the apex 9 of the triangle as the angle between said links increases.

The automatic closing element of the device is composed of a longitudinally resilient element 16 which may be a strip of rubber or a tension spring. One end of this element is attached preferably to the pivotal connection 9 at the apex of the triangle between the two arms, the attachment, in the form shown, being made to an arm 17 projecting substantially at right angles from the arm 5, and having an adjusting nut 18 thereon. The other end is attached to the door 1 by a pin 19 passing through any one of a number of holes 20 formed in the plate 4.

Said tension member, as shown in Fig. 1, is arranged preferably at an angle with respect to the links 5 and 8. The angle between the resilient element 16 and link 8 is greater than that between said resilient element and the link 5, said resilient element extending, as stated, from a point near the apex of the smaller triangle formed by links 5 and 8 and lying outside of said triangle. Its pull is in a direction which tends to decrease the angle between said links 5 and 8 and hence it resists the moving of said links apart to a greater angle.

During a substantial part of the closing operation, i. e., so long as the angle between the arms 5 and 8 is relatively large, the tension member 16 is engaged between its ends and comparatively near its point of attachment to the plate 4 by a roller 21 mounted on the plate 4, preferably on the same pin 3 on which the end of the arm 5 is pivoted. The reverse operation takes place when the door is opened, i. e., the angle between the arms 5 and 8 is increased, with the result that the tension member 16 is increasingly elongated and its tension increased during the initial part of the opening movement, whereupon said tension member is engaged by the pulley or roller 21 and is thereafter further elongated by drawing it part way around the pulley. As shown in Figure 1, the tension member 16 is arranged preferably at an angle to the arm 5, but as the door swings open said angle decreases until said tension member is substantially parallel to said arm, as shown in Figure 2, and this parallel relation is maintained as the tension member is being stretched around said pulley.

The operation of the device as shown in Figures 1 and 2 including both the braking element and the automatic closing element is as follows:

When the door 1 is opened from the position shown in Figure 1 to that shown in Figure 2, the direction of opening being shown by the arrow 22 in Figure 1, the braking element is drawn along the arm 5 by means of the stirrup 14 to a point close to the connection 9 between the arms 5 and 8. Moreover, after opening has proceeded for some time, the point of connection 3 of the arm 5 has swung so far with relation to the point of connection 19 of the resilient element 16 that the roller 21 on the arm engages said resilient element and finally comes to a position of rest, such as the position shown in Figure 2.

Closing of the door takes place in the direction of the arrow 23 in Figure 2. When the angle between the arms 5 and 8 has decreased to such an extent that the resilient element 16 is no longer engaged by the roller 21, then the angle between the member 16 and the arm 5 is increased and the changing position of the links, or toggle members in the system results in a substantial increase in the effectiveness of the pull exerted, with the result that the velocity of closing tends to be considerably increased. Also, the entire length of the resilient element 16 is available during the closing of the door.

While the automatic closing device has been operating as described, or when the door has been caused to swing towards closed position in any other way, the braking element has also entered into operation. When the door has closed some distance from the position in Figure 2 and as the roller 21 disengages the resilient element, the angle between the arms 5 and 8 has become sufficiently acute for the soft rubber section 10 to engage the arm 8 with which it has a comparatively high coefficient of friction. Its engagement with the arm 8 takes place while it is in a depression 24 in said arm, or slightly nearer the connection 9 than this depression, and thereafter it is wedged or forced away from the connection 9 by the increasing acuteness of the angle between the arms. The principal braking action is exerted as the soft rubber section 10 passes over the rising portion 24' of said depression. This braking action is so great that a sudden distinctly visible reduction in velocity in the door closing movement occurs at an angle of between about 20° and 40° from the fully closed position, depending on the position and depth of said depression. While the section 10 of the braking element is in the depression 24, the angle between the arms 5 and 8 becomes so acute that the section 11 of the braking element comes into contact with the arm 8 and about the time the section 10 leaves the depression 24, the angle is such that this section is moved out of engagement with the arm 8, leaving in engagement only the section 11, which has a considerably lower coefficient of friction with the arm than the section 10. In consequence of this and the greatly increased force exerted at about this time by the resilient element 16, the force with which the door is closing increases considerably although the latter acquires no great velocity owing to the comparatively small angle through which it still has to pass.

In certain cases, particularly if the door has a bolt to be latched upon closing, a second depression 25 is provided in the arm 8, the purpose of which is further to increase the closing force just at the moment when the bolt on the door is about to strike the plate on the door frame designed to press it back. Said depression is made just deep enough so that when the section 11 of the braking element enters it, all frictional engagement with the arm is lost or the amount of such frictional engagement is substantially reduced. In the fully closed position of the door the braking element is in the deepest part of the depression 25, as shown in Figure 1.

Under some conditions this increased closing force, applied just as the door closes, may cause the door to strike a little too hard and tend to rebound. This is readily overcome by applying a little added friction to one of the main actuating links. This friction may be obtained by means of a spring such as the spring 26 which normally tends to press the stirrup 14 against the link 8. This spring is mounted preferably on the pin 15, but a helical spring may be employed having one end connected to the stirrup 14 and the other end connected to the stirrup 12, causing the former to bear against the link 8 and create a slight friction thereon. The use of such a spring does not interfere with the function of the strip 14 in drawing the braking member toward the apex of the triangle when the links 5 and 8, representing the sides of the triangle, are swung apart, increasing the angle between them.

The slightly modified form of device shown in Figure 7 includes a different braking element (see Figure 6) which is constructed on the same principle as the element shown in Figures 1 and 2. In it, the section 30 corresponds in function to the section 10, and the section 31 to the section 11, said sections being constructed of similar material respectively to that of the sections 10 and 11. The section 30 is provided with a hard base 32 corresponding to the hard base 13 of the section 10. A spring corresponding to spring 26 in Figures 1 and 2 may be employed, if designed.

The arm 33 carries an adjusting screw 34 to vary the pull of the tension member 16.

In the modified form of braking element generally illustrated in Figures 8 to 10, the same principle is involved as in the case of the other two forms above described. In this case the brake element includes member 35 having a higher coefficient of friction with the arm it engages than the second member 36, member 35 coming into operation first, followed by member 36. However, in addition to the sliding movement of the whole element which occurs when the arms move relatively to one another, such as in the opening or closing of a door to which the device may be connected, the element is designed to swing or tilt about its pivot 37 to permit of smooth action during the initial movement of the door as it starts to swing to a closed position. The detailed structure and operation of this form of braking element will now be described.

Referring to Figures 9 and 10 particularly, it will be seen that the brake section 35, which is formed preferably from soft rubber, is designed to lie upon a suitable base 38 of fibre or the like. The section 35 has an extension 39 of reduced thickness, leaving a shoulder against which a suitable insert such as fibre or the like 40 is fitted to form a base on which the second brake section 36 is mounted. The parts described are held in a suitable frame or casing formed with sides 41, the grouped parts of the braking element being held in the framework by suitable clips or the like 43 and 44. The surfaces of the brake sections are preferably curved as shown and the arrangement is such that the brake section 36 may be slidably moved on its base 40 relatively to brake section 35, and held in adjusted position by means of a suitable adjusting screw or the like 45. In this way the arm 8 may be caused to engage the brake section 36 at an earlier or later moment in the return swinging movement of the door, in order to reduce or increase respectively the frictional resistance to the swinging movement of the arm 8 caused by the brake section 35. In this way, this form of braking device permits of very minute adjustment.

It will be noted that the outer surface of the base 38 is provided with two substantially straight surfaces 46 and 47 disposed at an angle to one another. As clearly illustrated in Figure 8 the surface 47 is caused to engage with the arm 5 in the initial closing movement of the door whereas, when the arms move to a point where they are disposed at a more acute angle to one another, the braking element assumes a position where the surface 46 engages with and moves on the arm 5. This swinging or tilting movement of the braking element during operation is permitted by virtue of its pivotal mounting on the pins 37 connecting the stirrups 12 and 14.

Other parts of the regulator shown in Figures 8 to 12 are generally the same as those shown in the other figures, with the specific exception that the arms of the stirrup 14 are connected by pin 47 at their outer ends and a roller 48 is mounted on the pin between the arms, which is designed to engage the arm 8 during the sliding movement of the brake element.

The operation of the structure shown in Figures 8 to 12 is similar in principle to that as described in connection with the other modifications, the arms 8 and 9 moving in the same manner and the depressions 24 and 25 having the same function. However, when during the return swinging movement of a door, to which the device may be attached, the arm 8 engages brake section 35, the brake element pivots and the surface 46 of the member 38 swings into engagement with the arm 5, permitting a ready, smooth, sliding movement of the brake element which acts with shock absorbing effect and obviates a rebounding of the arm 8 as initial contact takes place. After contact and as the arm 8 continues its winging movement towards arm 5, the brake element pivots as arm 8 comes into engagement with brake section 36 so that the surface 47 of the base member, as shown in Figure 8 in dotted lines, engages directly in sliding contact with arm 5. During this part of the swinging movement, the arm 8 is restrained to a considerable degree by its frictional engagement with brake section 35, but as it moves from engagement with said section and into engagement with the brake section 36, its speed increases. As the angle becomes more acute between the arms 8 and 9, however, and the pressure of the arm 8, on brake section 36 becomes more centralized and particularly when the swinging movement is influenced by a strong force, the brake section 36 will move inwardly and compress the rubber portion of the brake section 35 disposed below the insert 40, thus bringing the brake section 35 into contact with the arm 8 again, which causes a slowing up of the swinging movement. In other words, the braking element functions with a compensating action reacting proportionately to the force applied.

It will be realized that, due to the possibility of adjusting the brake sections towards or away from each other, the swinging movement of the regulator can be adjusted very finely through this medium. On the other hand, when it is considered that the resilient element 16 can be placed under more or less tension as desired through its tensioning member, it will be apparent that the regulator is susceptible of the most minute adjustment.

Figures 13 and 14 show a slightly modified arrangement whereby the door will remain open. This is accomplished by so mounting the resilient element 16 that it does not pass around the pulley but intersects the vertical plane passing through the arm 5. In order to avoid being engaged by the pulley, suitable means are provided for raising the end of said resilient member. The end of said member, which may be reinforced by a metal clip 48, is secured to a vertically adjustable shaft 49, which shaft is screw threaded and mounted in the bracket 4 and is provided at a lower point with a suitable handle 50. When the handle is rotated, the end 48 may be raised to the position shown in Figure 14 to permit the resilient member to clear the pulley. With this arrangement if the door is swung open to the position shown in Figure 13, i. e., a little more than 90°, it will remain open.

Although a pulley has been referred to it is not necessary that this part be a rotatable element as it may be any fixed part, having preferably a curved surface, if desired. For example, in Figures 13 and 14, only a part of a pulley is shown and this curved member 51 is not rotatably mounted but may be screwed or otherwise affixed to the bracket 4.

If a pulley of larger diameter is used than what is shown in the various figures, the effect will be to delay the time that the tension member leaves said pulley when the door is closing. In other words, the application of added force is delayed until the door is more nearly closed. This modification would be useful in the case of a light door such as a screen door or storm door. Furthermore, in the case of such a door the triangular shaped braking element may be dispensed with under some conditions. Instead of changing the size of the pulley to meet varying requirements, substantially the same result may be obtained by adjusting the curved block away from the end of the arm 5. Such an arrangement is shown in Figure 13 in which the curved block 51 is slidably mounted on the bracket 4 and may be adjusted by the screw 52.

Various other modifications may be made in the structures of the invention without departing from the spirit thereof.

I claim:

1. A regulator for the closing of two hinged parts, comprising two arms each pivoted at one end to one of the parts and at the other end to the other arm, so that the angle between said arms varies during the closing of the parts, and a regulating member positioned between said arms to frictionally engage and slide on the same, for mechanically varying the velocity of the closing movement in accordance with variations in such angle.

2. A regulator for the closing of two hinged parts, comprising two arms each pivoted at one end to one of the parts and at the other end to the other arm, so that the angle between said arms varies during the closing of the parts, and a regulating member for mechanically varying the velocity of the closing movement in accordance with variations in such angle, said regulating member being positioned between said arms in engagement with both, and composed of two sections of different frictional characteristics.

3. A regulator for the closing of two hinged parts, comprising two arms each pivoted at one end to one of the parts and at the other end to the other arm, so that the angle between said arms varies during the closing of the parts, and a regulating member for mechanically varying the velocity of the closing movement in accordance with variations in such angle, said regulating member being composed of two sections of different frictional characteristics slidably mounted on one arm, facing the other arm, and adapted to have its two sections frictionally engage such other arm one after the other during the closing operation.

4. A regulator as defined in claim 3, in which the section of the regulating member which first frictionally engages the arm during closing has a higher coefficient of friction therewith than the other section.

5. A regulator as defined in claim 3, in which a depression is formed on the side of the arm adapted to be frictionally engaged by the regulating member.

6. A regulator as defined in claim 3, in which two depressions are formed on the side of the arm facing the other arm on which said regulating member is mounted, one of said depressions being formed near the connection of said two arms and the second depression being formed in the arm near its connection to one of said hinged parts.

7. A regulator as defined in claim 3, in which said regulating member is of triangular shape, whereby as the angle between said arms is decreased during the closing movement of said two hinged parts, said arms tend to engage first the small end of said triangular shaped member and thereafter engage the larger end thereof.

8. A regulator as in claim 3, with the addition of a longitudinally resilient element so connected to said arms as to tend to reduce the angle between the same.

9. A device of the class described, comprising two continuous links connected at one end and normally spread apart at the other ends in the form of a triangle, said other ends being connected to a door frame and a hinged door therein respectively, and a tension member connected to said links near the apex of said triangle, and connected to said door at a point outside of the area of said triangle.

10. A device of the class described, comprising two links connected at one end and normally spread apart at the other ends in the form of a triangle, said other ends being connected to a door frame and a hinged door therein respectively, a tension member connected to said links near the apex of said triangle, and connected to said door at a point outside of the area of said triangle, and a triangular shaped braking member slidably mounted between said links, whereby said member is forced away from said apex as said links are pressed toward each other, to decrease the angle between them.

11. A device as in the preceding claim with the addition of means connected to said braking member and engaging the outer surfaces of said links, whereby when said links are moved apart to increase the angle between them, said means is forced toward the apex and draws said braking member with it.

12. A device of the class described comprising two links connected at one end and normally spread apart at the other ends in the form of a triangle, a braking member slidably mounted between said links, stirrups connected to said braking member and surrounding each of said links and resilient means normally pressing one of said stirrups against the corresponding link.

13. A device as in claim 9 with the addition of an abutment normally cleared by said tension member when the door is closed, but positioned on said door to be engaged by said tension member during the opening of said door and elongated during the further opening thereof.

14. A device of the class described comprising two links pivoted to one end and normally spread apart at the other ends in the form of a triangle, said other ends being connected to a fixed member and to a second member hinged thereto respectively, a tension member connected to said links near the apex of said triangle and connected at the other end to said hinged member at a point outside the area of said triangle, an abutment mounted on said hinged member to engage said tension member and press it to one side during the outward movement of said hinged member thereby elongating said tension member, said abutment being adjustable to cause said engagement to take place at different angular positions of said hinged member.

15. A device as in the preceding claim with the addition of means for moving the said point of connection of said tension member to said hinged member, with respect to said abutment, to prevent engagement of one by the other.

16. Means for regulating the angular movement between two hinged members, comprising two links each connected at one end to one of said members and pivotally connected at the other end to each other in the form of a triangle when said hinged members are in closed position, a tension member connected to said links near the apex of said triangle and connected to one of said members at a point outside the area of said triangle, a pulley connected to the link adjacent to said tension member near the point of attachment of said link to said hinged member, whereby when said hinged members are swung open said pulley engages said tension member and increases the tension thereof by elongating the same.

HARRY SMITH.